March 6, 1956

W. A. MILLER 2,737,630

MICROWAVE FILTER

Filed June 3, 1950

INVENTOR
William A. Miller
BY
ATTORNEY

March 6, 1956 W. A. MILLER 2,737,630
MICROWAVE FILTER

Filed June 3, 1950 2 Sheets-Sheet 2

INVENTOR
*William A. Miller*
BY *J. L. Whittaker*
ATTORNEY

United States Patent Office 2,737,630
Patented Mar. 6, 1956

2,737,630

MICROWAVE FILTER

William A. Miller, Miller Place, N. Y., assignor to Radio Corporation of America, a corporation of Delaware Application June 3, 1950, Serial No. 166,050

10 Claims. (Cl. 333—73)

This invention relates to microwave guide filters and particularly to such filters in which reflective surfaces, or the equivalents thereof, are established in the waveguide, whereby constructive interference between waves of the pass-band frequencies and reflection of waves of other than the pass-band frequencies are produced. More particularly, the invention relates to such filters in which the index of refraction of a waveguide is changed abruptly at sections critically positioned along the waveguide, by changes in the critical wave lengths of the guide sections, to cause constructive interference between the waves of the pass-band frequencies.

The obtaining of more highly selective filters has become more important with the increase in demands for the use of microwave apparatus. In some localities, the microwave transmissions have become so crowded that a more economical use of the available frequencies must be made. The frequencies must not only be accurate, but they must be controlled within definite and narrow limits of band widths. In some cases, such as for example the multi-transmitter use of a single antenna, highly discriminating filters are essential.

In the prior art, such as for example that disclosed in the U. S. Patent 2,407,911, microwave filters have been based upon the reflectionless transmission of the electromagnetic waves from one propagating region to another. Such filters have consisted of two or more dielectric blocks, or of constructions of waveguides of impedance-varying sections, so selected that waves of other than the pass-band frequencies are annulled or cancelled by destructive interference.

On the other hand, the present invention is based upon the phenomena of constructive interference, that is, the waves of the pass-band frequencies are combined to produce maximum amplitudes. This fundamental difference between the present invention and the microwave filters of the prior art requires different critical constructions and proportions, as will be particularly pointed out hereinafter.

An object of the invention is to provide in a waveguide a microwave filter of high discrimination without introducing into the waveguide any extraneous materials, either insulating or conducting.

Another object of the invention is to provide in a waveguide a microwave filter of high discrimination in which no loss of power is had in the waveguide due to presence of dielectrics.

Another object of the invention is to provide in a waveguide a microwave filter of high discrimination by inserting reflecting transition waveguide sections in the structure of the waveguide itself.

Another object of the invention is to provide in a waveguide a microwave filter of high discrimination by abruptly changing the index of refraction of sections of the waveguide at predetermined positions along the waveguide.

Another object of the invention is to provide in a waveguide a microwave filter of high discrimination by abruptly changing the critical wave length of the waveguide at predetermined positions along the waveguide.

Other objects and advantages of the invention will be apparent from the following detailed description made with reference to the accompanying drawings in which.

Figure 6:
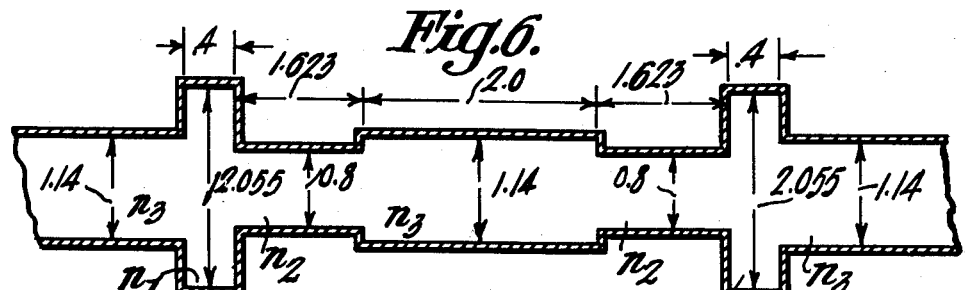
Fig. 6 is a top view of a waveguide filter, the dimensions of which have been determined in accordance with the principles of this invention.
Figure 7:
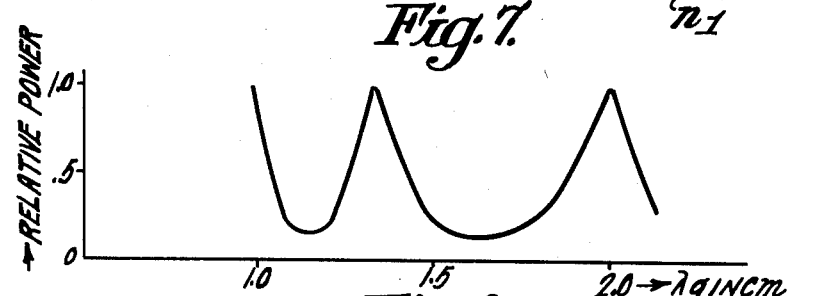
Figure 8:
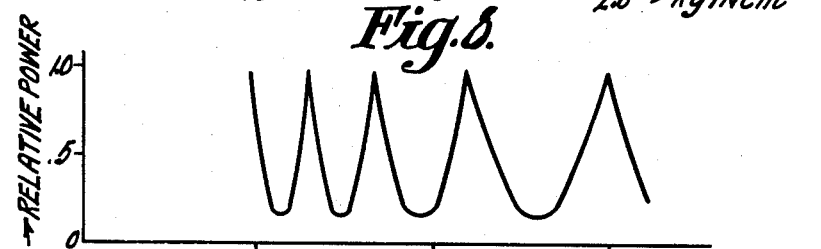
Figure 9:
Figure 10:
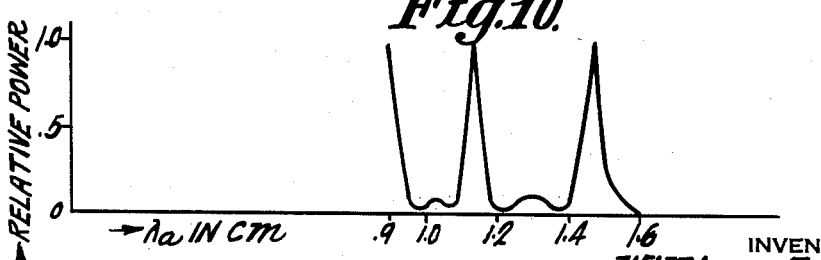

Figs. 7, 8, and 9 are performance graphs of filters and combinations of filters shown in Fig. 6 with different separations of the filter units and filters thereof; and Fig. 10 is a performance graph of a filter in a waveguide plotted over a range of wave lengths of the radiated transmission in the guide expressed in wave lengths in free air.

Figure 1:
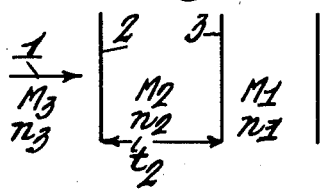
Fig. 1 is a diagrammatic representation of three regions of different indexes of refraction through which pass electromagnetic waves at zero angle of incidence to the surfaces separating the three regions.

Referring to Fig. 1, electromagnetic waves travel in the direction of the arrow 1 through medium M3, pass through the surface 2 separating medium M3 from medium M2, pass through medium M2 to surface 3, where medium M2 is backed up by a medium M1. The indexes of refraction of mediums M3, M2 and M1 are designated as $n_3$, $n_2$ and $n_1$, respectively. The thickness of medium M2 is designated as $t_2$.

As the angle of incidence of wave 1 to surfaces 2 and 3 is zero, there will be no multiple reflections and the coefficient of reflection at surface 3 ($A'$) may be written from Fresnel's laws of reflection:

$$A' = \frac{n_2 - n_1}{n_2 + n_1} \quad (1)$$

and the coefficient of reflection at surface 2 ($B'$) may be written:

$$B' = \frac{n_3 - n_2}{n_3 + n_2} \quad (2)$$

If multiple reflections between surfaces 2 and 3 and the resulting phases are considered, the reflection coefficient ($\rho^2$) at surface 2 may be stated as:

$$\rho^2 = \left(\frac{B' - A'e^{ix}}{1 + B'A'e^{ix}}\right)^2 \quad (3)$$

where $$x = \frac{4\pi t_2^2}{\lambda/n_2} \quad (4)$$

$\lambda$ is the wave length of the waves and ($e$) is the Napierian logarithum base.

To prove that Equation 3 holds true for electromagnetic waves in waveguides, assume $t_2 = \lambda_g/2$, where $\lambda_g$ is the wave length of the radiation in an unobstructed waveguide. Equation 3 then becomes:

$$\rho^2 = \left(\frac{n_3 - n_1}{n_3 + n_1}\right)^2 \quad (5)$$

Equation 5 shows that medium M2 has no effect on the reflection from surface 2, which is borne out by the characteristics of a transmission line one-half wave length long.

If $t_2 = \lambda_g/4$, then Equation 3 becomes:

$$\rho^2 = \left(\frac{n_2^2 - n_1 n_3}{n_2^2 + n_1 n_3}\right)^2 \qquad (6)$$

If $n_2^2 = n_1 n_3$, then $\rho^2$ equals zero, which corresponds to the characteristics of a transmission line of one quarter-wave length acting as a matching transformer.

For the purposes of this invention, a very highly reflective surface is desired between the mediums. Therefore, the relation of the indexes of refraction should be:

$$n_2^2 \gg n_1 n_3 \qquad (7)$$

From this inequality it is apparent that the square of the effective index of refraction of the intermediate of the three sections should be substantially greater than the product of the effective indexes of the extreme sections. As illustrated hereinafter, substantially greater means about three times or more greater.

The analysis of the phenomena and the equations developed in connection with the mediums in Fig. 1, may be applied to waveguides and become the basis for defining the structural characteristics of sections of waveguides to produce filtering. In applying to waveguides the equations developed in connection with Fig. 1, the index of refraction of a standard unobstructed waveguide 4 is taken as unity. By definition, the index refraction of a material is the ratio of (1) the velocity of the wave in a standard substance to (2) the velocity of the wave in the material. The index of refraction in any individual guide section may, therefore, be determined or changed by changing the group velocity of the waves being propagated down the guide. Assigning indexes of refraction to Fig. 2, corresponding to the indexes of the mediums in Fig. 1, the indexes of refraction of waveguide sections 4, 5, and 6 become $n_3$, $n_2$ and $n_1$, respectively the indexes being measured relative to the velocity of propagation in the unobstructed waveguide 4.

Figure 2:
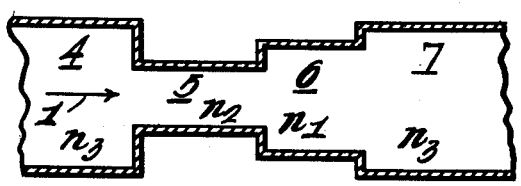
Fig. 2 is a top view of a waveguide reflection unit having two waveguide sections of different critical wave lengths.

Referring to Fig. 2, waves 1 are propagated through a standard waveguide 4 in the direction of the arrow, pass through the abruptly narrowed waveguide section 5, pass through the abruptly widened waveguide section 6 and pass through the further abruptly widened waveguide section 7, which is of the same width as section 4. The widths of sections 5 and 6 are different from each other and different from the width of guide 4. There are thus formed in the waveguide system, a unit that has the full reflective equivalents of the mediums and separating surfaces in Fig. 1. The determination of the widths and lengths of the waveguide sections to form filter sections and the assembly of filter sections in a waveguide system will be disclosed hereinafter.

In Fig. 2, 4, 7 are two portions of a standard unobstructed waveguide in which are positioned two sections of waveguides, 5 and 6, respectively the widths of which are different from each other and different from guide 4, 7. The two sections 5 and 6, in cooperation with waveguide 4, 7 constitute an embodiment of the constructive interference reflection unit of the present invention corresponding to the dielectrics of Fig. 1.

As the developed equations are to be applied to filters in waveguides, $\lambda_g$ is defined as the wave length of the radiation in the standard unobstructed waveguide that is to be passed through the filter. For convenience in this specification and in the appended claims, $\lambda_g$ will be referred to as the "guidewave-length."

A standard rectangular guide of height $h$ and with $Z_0$, propagating the TE$_{01}$ mode, has been chosen as the basis to which is applied the principles of the invention. The application of such principles to other forms of waveguides and other modes of propagation will be obvious to those skilled in this art.

Applying the definition of the index of refraction to waveguide section 4, which definition also applies to any waveguide, $$n = \frac{V_a}{V_g} = \frac{\lambda_g}{\lambda_a} \qquad (10)$$

where $V_a$ is the velocity of the wave in air
$V_g$ is the group velocity of the wave in the guide
$\lambda_g$ is the wave length in the guide
$\lambda_a$ is the wave length in air.

For TE$_{01}$ waves:

$$\lambda_g = \lambda_a / \left(1 - \frac{\lambda_a^2}{\lambda_c^2}\right)^{1/2} \qquad (11)$$

where $\lambda_c$ is the critical wave length in the guide. Substituting in Equation 10:

$$n = \frac{1}{\left(1 - \frac{\lambda_a^2}{\lambda_c^2}\right)^{1/2}} \qquad (12)$$

($n$) may, therefore, be plotted as a function $\lambda_a/\lambda_c$. A graph showing this relation is plotted in Fig. 3.

From an examination of this graph, it is obvious that any index of refraction from unity to infinity is available for use and that regions of high index of refraction are regions of high dispersion.

As dispersion in a waveguide (D) is the differential of the index of refraction with respect to the wave length in air, $$D = \frac{dn}{d\lambda_a} = \frac{\lambda_a}{\lambda_a} / \left(1 - \frac{\lambda_a^2}{\lambda_c^2}\right)^{3/2} \qquad (13)$$

The dispersion (D) may therefore be plotted as a function of $\lambda_a/\lambda_c$. A graph showing this relation is plotted in Fig. 4.

The index of refraction $n_{js}$ of any guide, $j$, with respect to any guide chosen as a stndard, $s$, is defined as:

$$n_{js} = \frac{1}{k}\left(\frac{k^2 \lambda_{cj}^2 - \lambda_a^2}{\lambda_{cj}^2 - \lambda_a^2}\right)^{1/2} \qquad (14)$$

where $$k = \frac{\text{critical wave length in guide } s}{\text{critical wave length in guide } j} = \frac{\lambda_{cs}}{\lambda_{cj}} \qquad (15)$$

This is verified by setting $$n_{js} = \frac{\text{group velocity in guide } s}{\text{group velocity in guide } j} = \frac{V_{gs}}{V_{gj}} \qquad (16)$$

and substituting the values of $V_{gs}$ and $V_{gj}$ given in terms of critical wave lengths and wave lengths in air.

It will be noted that if $n_j$ is the index of refraction of guide $j$ with respect to air and if $n_s$ is the index of refraction of guide $s$ with respect to air, $n_j = V_a/V_{gj}$, $n_s = V_a/V_{gs}$ and $n_{js} = V_{gs}/V_{gj}$. Therefore, $$n_{js} = \frac{V_a}{V_{gj}} \cdot \frac{V_{gs}}{V_a} = n_j \cdot \frac{1}{n_s} = n_j/n_s \qquad (17)$$

From the above it may be concluded that for TE$_{01}$ waves, the index of refraction of the guides may be determined or adjusted to a definite value by changing the critical wave length of the guide. This may be done by changing the width of the guide.

Referring to Equation 6, as guide 4 is the standard unobstructed waveguide, $n_3$ equals unity and Equation 6 becomes:

$$\rho^2 = \left(\frac{n_2^2 - n_1}{n_2^2 + n_1}\right)^2 \qquad (18)$$

and Inequality 7 becomes:

$$n_2^2 \gg n_1 \qquad (19)$$

Figure 3:
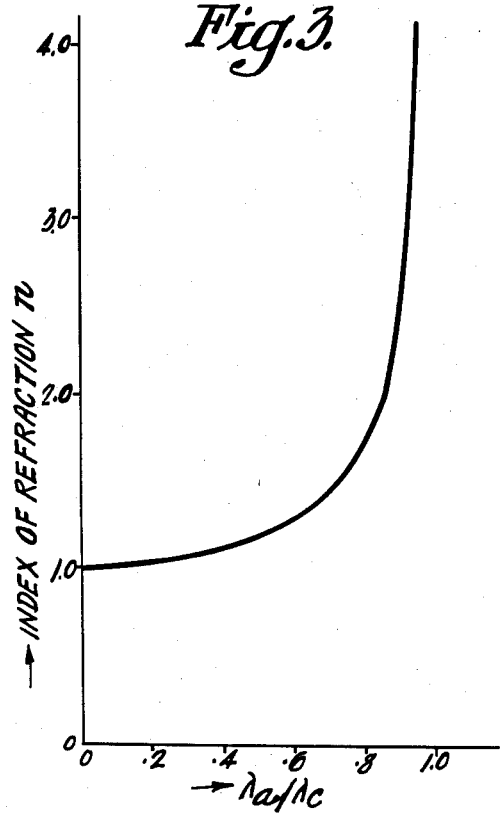
Fig. 3 is a graph showing the relation of the index of refraction ($n$) of a waveguide to the ratio of (1) the free space wave length ($\lambda_a$) to (2) the critical wave length of the guide ($\lambda_c$)
Figure 4:
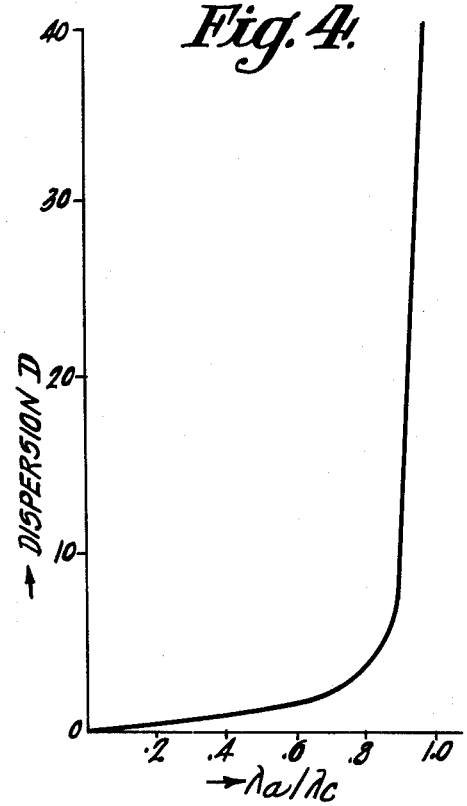
Fig. 4 is a graph showing the relation of the dispersion (D) in a waveguide to the ratio of (1) the free space wave length ($\lambda_a$) to (2) the critical wave length of the waveguide ($\lambda_c$)
Figure 5:
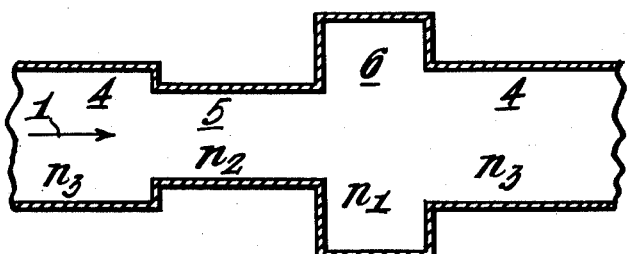
Fig. 5 is a top view of a reflection unit for a waveguide that is the equivalent to the mediums in Fig. 1.

To apply the equations and data set forth herein to the determination of the construction details of the guide sections of the filter, such as are illustrated in Fig. 5, it will be noted from Fig. 3 that any value of $n_2$ is available for use. Fig. 4, however, shows that the higher in value that $n_2$ is made, the more rapidly $n_2$ will change with frequency. It is, therefore, of decided advantage to avoid making $n_2$ any larger than is absolutely necessary.

An examination of Equation 6 shows that $\rho^2$ may be made as large as desired (up to the value of unity) independently of the value of $n_2$, provided the product of $n_1$ and $n_3$ is kept small.

Having chosen guide 4 as standard(s), $$n_3 = 1$$
$$n_{23} = n_2/n_3$$
$$n_{13} = n_1/n_3$$

It is obvious that $n_1$, $n_2$, and $n_3$ can never be less than unity, but both or either $n_{23}$ or $n_{13}$ may be made less than unity.

The value of $\rho^2$ then becomes:

$$\rho^2 = \left(\frac{n_{23}^2 - n_{13}}{n_{23}^2 + n_{13}}\right)^2 \quad (20)$$

It is apparent that in order that $n_1$ may not be less than unity, $n_{13}$ multiplied by $n_3$ must not be less than unity.

The reflection unit (top view) in Fig. 5 is proportioned in its sections such that $n_1$ is less than $n_3$ by increasing the width (Zo) of the guide section 6. The reflection unit of Fig. 5 yields high values of $\rho^2$ for low values of index $n_{23}$. This is desirable since otherwise a filter employing the unit would be operating in a region where the dispersion is large and the filter would be frequency sensitive.

The section 5 of index $n_2$ and the section 6 of index $n_1$ are one quarter of the guide-wave-length long, measured in their respective sections.

As an example of the application of the principles of the invention to a filter for a waveguide, let it be assumed that the wave length (in air) of the radiation to be passed through the filter is 1.5 cm. ($\lambda_a = 1.5$ cm.). The guide-wave-length $\lambda_g$ will be chosen to be 2.0 cm. and $n_3 = \lambda$.

The value of $n_{13}$ is next chosen such that $n_{13}$ multiplied by $n_3$ is not less than unity. If $n_{13}$ equals 0.8, $n_1$ will equal 1.065.

With an arbitrarily chosen value of $\rho^2$ equal to 0.5, Equation 20 becomes:

$$0.5 = \left(\frac{n_{23} - 0.8}{n_{23} + 0.8}\right)^2 \quad (21)$$

from which $n_{23}$ is found to be equal to 2.13.

As $n_2$ equals $n_{23}$ multiplied by $n_3$, $n_2$ equals 2.83.
From the graph in Fig. 3:

$$n_3 = 1.33(\lambda_a/\lambda_c)_3 = 0.655$$
$$n_2 = 2.83(\lambda_a/\lambda_c)_2 = 0.935$$
$$n_1 = 1.065(\lambda_a/\lambda_c)_1 = 0.365$$

Thus $n_2^2$ is 0.872 and $n_1$ times $n_3$ is 0.239. Therefore, the square of the effective index of the intermediate section, is over three times as great as the product of the effective indexes of the extreme sections where $(\lambda a/\lambda_c)j$ refers to the guide of index $(n)_j$.

If the guide section has a width of $(Z_0)_j$, the cutoff wave length of the section $\lambda_c$ equals $2(Z_0)_j$. Therefore:

For the guide section of index $n_1$, $(Z_0) = 2.055$ cm. and guide length = 0.4 cm.

For the guide section of index $n_2$, $(Z_0)_2 = 0.8$ cm. and guide length = 1.623 cm.

For the guide section of index $n_3$, $(Z_0)_3 = 1.14$ cm. and guide length = 2.0 cm.

Such a filter is shown (top view) in Fig. 6, the dimensions being given in cms.

The performance efficiency of the filter is determined by the relative currents that flow through the filter over the range of frequencies of radiation transmitted by the guide. From Born, "Optik" (Springer, 1933, p. 123) the total transmitted power (I) through two reflecting surfaces in series, such as shown in Fig. 6 is:

$$I = \sigma^2/(1-\rho^2)^2 + 4\rho^2 \sin^2(\pi_p) \quad (22)$$

where $\rho^2$ is the reflection coefficient, $\sigma^2$ is the transmission coefficient, and $(\pi_p)$ is the phase difference between (1) a wave passing through two surfaces a distant apart and (2) a wave twice reflected by the surfaces before being transmitted through the second surface. At zero angle of incidence of the wave to the surfaces, $\pi_p$ becomes equal to $2\pi l/\lambda$, where $\lambda$ is the wave length of the radiation.

If there be no absorption of energy, $\sigma^2$ plus $\rho^2$ equals unity and Equation 22 becomes:

$$I = \frac{1}{1 + a^2 \sin^2\left(\frac{2\pi l}{\lambda}\right)} \quad (23)$$

where $$a^2 = 4\rho^2/(1-\rho^2)^2$$

The relative power transmitted through a filter, as shown in Fig. 6, has been plotted in Fig. 7 over a range from 1 cm. to 2.3 cms., the two guide sections of the filter of index $n_2$ being separated by a section of the standard guide equal in length to one guide-wave-length.

In Fig. 8 is plotted the relative power graph of a similar filter except that the two guide sections of the filter of index $n_2$ are separated by a section of the standard guide equal in length to two guide-wave-lengths.

To obtain a further degree of filtering, two or more of the filters of this invention may be connected in cascade in a waveguide system. As an example, a filter with unit separation of one guide-wave-length, the relative power graph of which is plotted in Fig. 7, may be combined with the filter with unit separation of twice the guide-wave-length, the relative power graph of which is plotted in Fig. 8. The relative power graph of such a combination, with separation of the filters by a standard waveguide section of one quarter of the guide-wave-length, is shown in Fig. 9.

In the graphs of Figs. 7 and 8, the range of wave lengths, over which the relative power was plotted, was expressed in terms of the wave lengths in the guide. From the equations developed herein, involving the wave lengths of the radiation in the guides and the wave lengths in air, it is apparent that the relative power transmitted through the filter may be plotted for values of the wave lengths in air. A graph of relative power versus wave length in air is plotted in Fig. 9 for the filter of Fig. 6.

There is thus described a microwave guide filter consisting of reflection units made of contiguous waveguide sections inserted in a waveguide system, the units being separated by a section of the standard waveguide of the system. The lengths of the waveguide sections in the reflection units are one quarter the guide-wave-length measured in their respective sections. The widths of the waveguide sections are defined by equations and are of such widths as to form effective or equivalent reflective surfaces to cause maximum reflection amplitudes of waves propagated in the standard waveguide of frequencies other than the frequency to be filtered. The separation of the filter units is by standard waveguide sections the lengths of which are an integar (including unity) multiple of the guide-wave-length.

What is claimed is:

1. A microwave filter for a waveguide having an effective index of refraction $n_3$ comprising: two reflection units separated by a section of said waveguide of a length equal to an integral multiple (including unity) of the guide-wave-length, each of said units consisting of two contiguous waveguide sections having effective indexes of refraction of $n_1$ and respectively, the order of the waveguide sections along the waveguide by indexes of refraction being $n_1$, $n_2$ and $n_2$, $n_1$ and $n_2^2$ being substantially greater than the product $n_1 \cdot n_3$ due to the different dimensions between the sections of the pair and the waveguide.

2. A microwave filter for a waveguide having an effective index of refraction of $n_3$ comprising: two reflection units, each unit consisting of a pair of contiguous waveguide sections having effective indexes of refraction of $n_1$ and $n_2$ respectively, the two filter units being separated by a section of said waveguide of a length equal to an integral multiple (including unity) of guide-wave-length, the order of the waveguide sections along the waveguide by indexes of refraction being $n_1$, $n_2$, $n_3$, $n_2$, and $n_1$, the lengths of the sections of indexes $n_1$ and $n_2$ being one quarter the guide-wave-length measured in their respective sections, and the indexes of refraction of said filter waveguide sections being such that waves of lengths other than the guide-wave-length are reflected at maximum amplitudes and $n_2^2$ being substantially greater than $n_1 \cdot n_3$, due to the different dimensions of the sections and the waveguide.

3. A microwave unit for a waveguide filter for connection to an end of a section of hollowpipe waveguide having an effective index of refraction $n_3$ due to the height $h$ and width $w_3$ of said hollowpipe waveguide section, said microwave unit comprising a first waveguide filter section for connection to said waveguide end said first waveguide filter section having an effective index of refraction $n_2$ due to the height $h$ and width $w_2$ of said first filter section, and a second waveguide filter section connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_2$ being smaller than either of $w_1$ and $w_3$.

4. A microwave unit for a waveguide filter for connection to an end of a section of hollowpipe waveguide having an effective index of refraction $n_3$ due to the height $h$ and width $w_3$ of said hollowpipe waveguide section, said microwave unit comprising a first waveguide filter section one-quarter guide wavelength long for connection to said waveguide end said first waveguide filter section having an effective index of refraction $n_2$ due to the height $h$ and width $w_2$ of said first filter section, and a second waveguide filter section one-quarter guide wavelength long connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_2$ being smaller than either of $w_1$ and $w_3$.

5. A microwave unit for a waveguide filter for connection to an end of a section of hollowpipe waveguide having an effective index of refraction $n_3$ due to the height $h$ and width $w_3$ of said hollowpipe waveguide section, said microwave unit comprising a first waveguide filter section for connection to said waveguide end said first waveguide filter section having an effective index of refraction $n_2$ due to the height $h$ and width $w_2$ of said first filter section, $w_2$ being smaller than $w_3$, and a second waveguide filter section connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_1$ being greater than $w_2$ and smaller than $w_3$.

6. A microwave unit for a waveguide filter for connection to an end of a section of hollowpipe waveguide having an effective index of refraction $n_3$ due to the height $h$ and width $w_3$ of said hollowpipe waveguide section, said microwave unit comprising a first waveguide filter section one-quarter guide wavelength long for connection to said waveguide end said first waveguide filter section having an effective index of refraction $n_2$ due to the height $h$ and width $w_2$ of said first filter section, $w_2$ being smaller than $w_3$, and a second waveguide filter section one-quarter guide wavelength long connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_1$ being greater than $w_2$ and smaller than $w_3$.

7. A microwave unit for a waveguide filter for connection to an end of a section of hollowpipe waveguide having an effective index of refraction $n_3$ due to the height $h$ and width $w_3$ of said hollowpipe waveguide section, said microwave unit comprising a first waveguide filter section for connection to said waveguide end said first waveguide filter section having an effective index of refraction $n_2$ due to the height $h$ and width $w_2$ of said first filter section, $w_2$ being smaller than $w_3$, and a second waveguide filter section connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_1$ being greater than both $w_2$ and $w_3$.

8. A microwave unit for a waveguide filter for connection to an end of a section of hollowpipe waveguide having an effective index of refraction $n_3$ due to the height $h$ and width $w_3$ of said hollowpipe waveguide section, said microwave unit comprising a first waveguide filter section one-quarter guide wavelength long for connection to said waveguide end said first waveguide filter section having an effective index of refraction $n_2$ due to the height $h$ and width $w_2$ of said first filter section, $w_2$ being smaller than $w_3$, and a second waveguide filter section one-quarter guide wavelength long connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_1$ being greater than both $w_2$ and $w_3$.

9. A microwave filter for connection to an end of a section of hollowpipe waveguide having an effective index of refraction $n_3$ due to the height $h$ and width $w_3$ of said hollowpipe waveguide section, said microwave filter comprising two reflection filter units separated by a section of said hollowpipe waveguide having an effective index of refraction $n_3$ of a length an integral multiple (including unity) of its guide wavelength, each of said filter units comprising a first waveguide filter section having an effective index of refraction $n_2$ due to the height $h$ and width $w_2$ of said first filter section, and a second waveguide filter section connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_2$ being smaller than either $w_1$ and $w_3$.

10. A microwave filter for connection to an end of a section of hollowpipe waveguide having an effective index of refraction $n_3$ due to the height $h$ and width $w_3$ of said hollowpipe waveguide section, said microwave filter comprising two reflection filter units separated by a section of said hollowpipe waveguide having an effective index of refraction $n_3$ of a length an integral multiple (including unity) of its guide wavelength, each of said filter units comprising a first waveguide filter section one-quarter guide wavelength long having an effective index of refraction $n_2$ due to the height $h$ and width $w_2$ of said first filter section, and a second waveguide filter section one-quarter guide wavelength long connected to said first waveguide filter section said second waveguide filter section having an effective index of refraction $n_1$ due to the height $h$ and width $w_1$ of said second filter section, $n_2^2$ being substantially greater than the product $n_1 \cdot n_3$ and $w_2$ being smaller than either of $w_1$ and $w_3$.

References Cited in the file of this patent

UNITED STATES PATENTS

| | | |
|---|---|---|
| 2,407,911 | Tonks et al. | Sept. 17, 1946 |
| 2,411,534 | Fox | Nov. 26, 1946 |
| 2,433,368 | Johnson et al. | Dec. 30, 1947 |
| 2,466,119 | Moulton | Apr. 5, 1949 |
| 2,514,678 | Southworth | July 11, 1950 |
| 2,519,722 | Turner | Aug. 22, 1950 |
| 2,590,906 | Tripp | Apr. 1, 1952 |